United States Patent [19]

Toyomasu et al.

[11] 4,145,068
[45] Mar. 20, 1979

[54] METHOD OF MANUFACTURING BICYCLE FRAME BY DIE CASTING AND BICYCLE FRAME MANUFACTURED THEREBY

[75] Inventors: Takeshi Toyomasu; Michito Furusawa; Sadao Mabuchi; Mitsuo Gushima, all of Ageo, Japan

[73] Assignee: Bridgestone Cycle Co. Ltd., Tokyo, Japan

[21] Appl. No.: 804,531

[22] Filed: Jun. 8, 1977

[30] Foreign Application Priority Data

Jun. 18, 1976 [JP] Japan .................... 51-80027[U]

[51] Int. Cl.² ............... B62K 3/04; B62K 19/12
[52] U.S. Cl. ................. 280/281 R; 29/527.5; 164/98; 280/274; 403/269
[58] Field of Search ............. 280/281 R, 274; 29/527.5; 403/267, 269, 361; 164/98, 108, 112

[56] References Cited

U.S. PATENT DOCUMENTS 3,456,330  7/1969  Norcross .................. 164/98 X

FOREIGN PATENT DOCUMENTS 328827  8/1935  Italy ...................... 280/281 R

OTHER PUBLICATIONS

Japanese Patent Application, Publication No. 1010/51, "Apparatus for Manufacturing Bicycle Frames", issued Feb. 27, 1951.

Japanese Patent Application, Publication No. 11504/63, "Die Cast Tube Frames for Motorcycles and Apparatus therefor."

Primary Examiner—Joseph F. Peters, Jr.
Assistant Examiner—Donn McGiehan
Attorney, Agent, or Firm—Stevens, Davis, Miller & Mosher

[57] ABSTRACT

A bicycle frame comprises tubes closed at their ends and lugs for connecting the tubes to form the frame, which lugs are formed by die casting in dies in which the tubes are arranged so as to integrally surround the closed ends of the tubes by the die-cast lugs. The tubes are previously formed at their ends with tapered portions each extending from that corresponding to an extreme end of a boss of the lug surrounding the end of the tube toward an extreme end of the tube. The outer surfaces of the bosses of the die-cast lugs are in substantially constant outer diameter or slightly tapered, thereby, in conjunction with the tapered portions of the tube, eliminating stress concentrations at the extreme ends of the bosses of the lugs, and saving the amount of the die-cast metal resulting in light weight bicycles which can save driving power and cost of manufacture.

2 Claims, 11 Drawing Figures

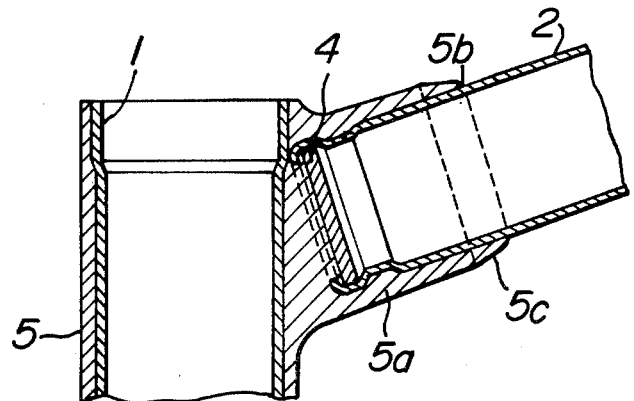
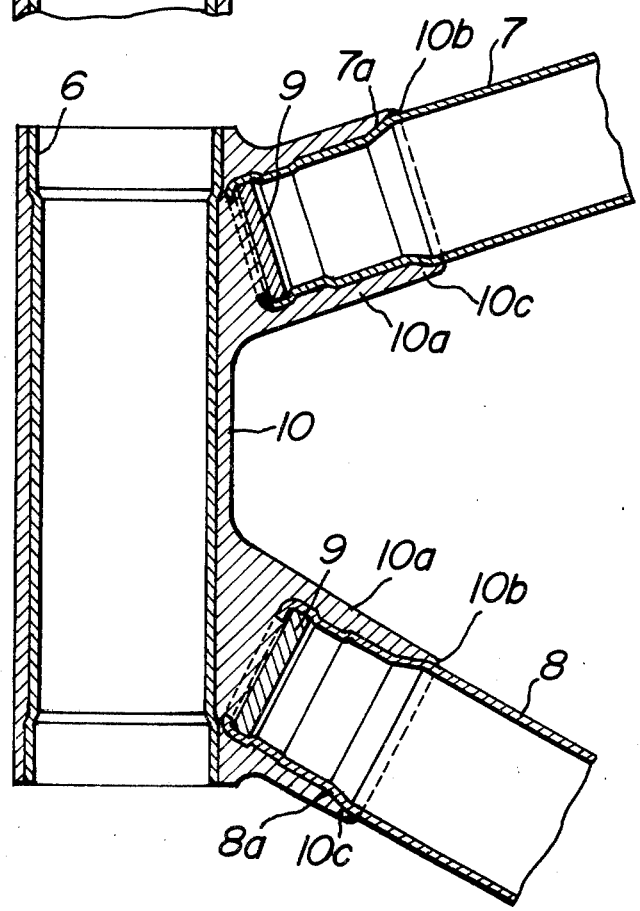

METHOD OF MANUFACTURING BICYCLE FRAME BY DIE CASTING AND BICYCLE FRAME MANUFACTURED THEREBY

BACKGROUND OF THE INVENTION (1) Field of the Invention

The present invention relates to a method of manufacturing a bicycle frame by die casting consisting of tubes closed at their ends and lugs for connecting the tubes by forcing molten metal into cavities of dies corresponding in configuration to the lugs to form the lugs, in which dies the tubes are arranged in position in a final frame when the lugs are die-cast, and a bicycle frame manufactured by the method.

(2) Description of the Prior Art

Bicycle frames have been manufactured by die casting for the purpose of increasing their strength and durability to meet the high power and great dynamic energy resulting from the high speed and improved performance of the modern bicycle.

Die-cast lugs or brackets for connecting tubes for the bicycle frames in the prior art have in general wall thickness thicker than those required to obtain the sufficient strength in view of the problems on die casting. In order to avoid a risk of collapse of the tubes inserted in dies when the lugs are die-cast, injection speed and pressure of molten metal are limited to low values. Under such low injection speed and pressure, unduly thick walls are required to ensure a good run of molten metal. As the result, bosses of the die-cast lugs in the prior art have relatively large outer diameter resulting in stress concentrations at portions of tubes corresponding to extreme ends of the bosses of the lugs or brackets.

In order to avoid the stress concentrations, it has been suggested that an end of the boss of the lug be tapered. Such a tapered boss of a lug, however, makes it difficult to manufacture dies for the die casting, and therefore makes it difficult to fit the upper and lower dies causing burrs or thin fins on the boss corresponding to the parting plane of the dies, which require extra time and cost for removal.

SUMMARY OF THE INVENTION

A primary object of the invention is, therefore, to provide a method of manufacturing bicycle frames by die casting and bicycle frames manufactured by the method to avoid stress concentrations at extreme ends of bosses of lugs without increasing cost of dies and without the troubles of removal of burrs.

A further object of the invention is to provide bicycle frames which are light weight and low cost by saving the die-cast metal and capable of saving the driving power and have attractive appearances.

In order to achieve these objects, the method of manufacturing a bicycle frame according to the invention comprises the steps of forming tapered portions at said closed ends of the tubes before die casting said lugs, said tapered portion extending from that corresponding to an extreme end of a boss of said lug surrounding the end of the tube toward an extreme end of the tube, and forming outer surfaces of said bosses of the die cast lugs in substantially constant outer diameter, thereby progressively reducing thicknesses of walls of the bosses at their extreme ends along said tapered portions of said tubes, maintaining necessary and sufficient thickness of said lugs.

The bicycle frame according to the invention comprises said tubes being formed at their closed ends with tapered portions each extending from that corresponding to an extreme end of a boss of said lug surrounding the end of the tube toward an extreme end of the tube, and outer surfaces of said bosses of the die-cast lugs being in substantially constant outer diameter, thereby progressively reducing thicknesses of walls of the bosses at their extreme ends along said tapered portions of said tubes, maintaining necessary and sufficient thickness of said lugs.

BRIEF DESCRIPTION OF THE DRAWING

The foregoing objects and other objects as well as the characteristic features of the invention will become more apparent and more readily understandable by the following description and the appended claims when read in conjunction with the accompanying drawings, in which:

FIG. 3 is a sectional view of part of another lug made according to the prior art FIG. 4 is a sectional view of a head lug and ends of top and down tubes according to the present invention;

DESCRIPTION OF THE PREFERRED EMBODIMENTS

Figure 1:
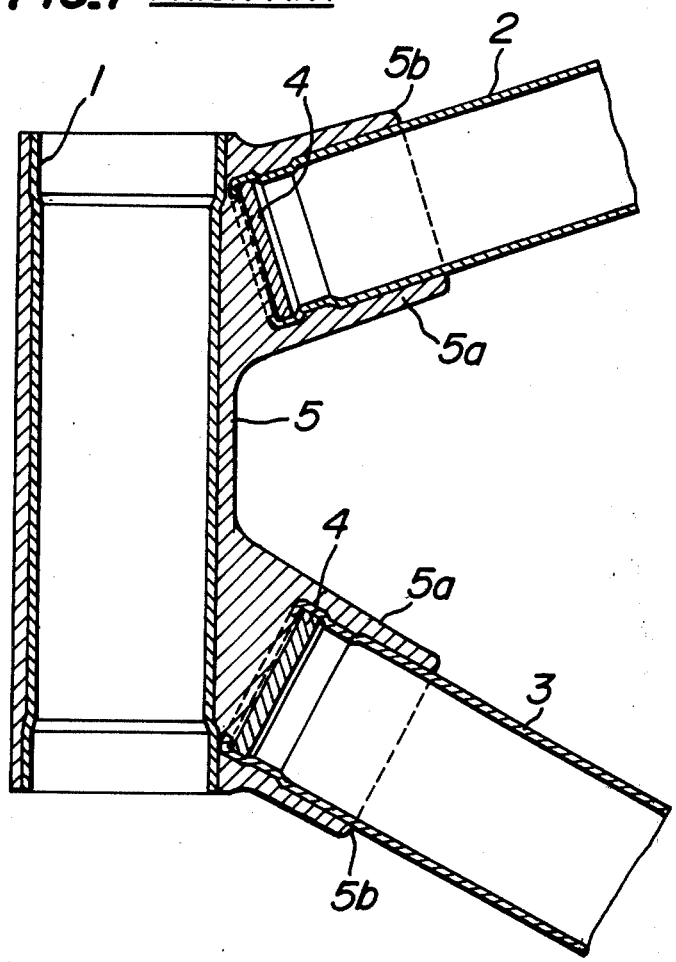
FIG. 1 is a sectional view of part of a bicycle frame manufactured by die casting in prior art.
Figure 2:
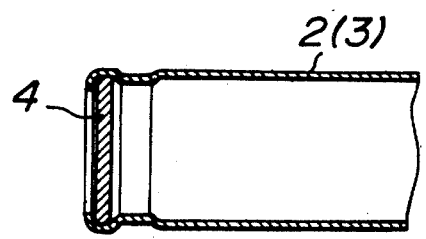
FIG. 2 is a sectional view of one end of a tube used in the frame shown in FIG. 1.

FIGS. 1-3 illustrate examples of joints or lugs of bicycle frames made by die casting in the prior art. Referring to FIGS. 1 and 2, a head tube 1 of the frame comprises a die-cast joint or lug 5 for integrally combining a top tube 2 and a down tube 3 with the head tube 1. The ends of the tubes 1 and 2 are closed by closure members 4 before they are enclosed in the lug 5 by die casting.

The die-cast lug 5 in the prior art has in general wall thicknesses thicker than those required for sufficient strength in order to obtain a good run of molten metal under the limitation of the injection speed and casting pressure in consideration of the risk of collapse of ends of the tube inserted in dies when the lug is die-cast. As the result, bosses 5a of the die-cast lug 5 in the prior art have relatively large outer diameters as shown in FIG.

1, resulting in stress concentrations at the portions of the tubes 2 and 3 corresponding to the ends 5b of the lug.

In order to avoid the stress concentration, it has been suggested that end 5c of the boss 5a of the lug 5 be tapered. Such a tapered boss of a lug makes it difficult to manufacture dies for the die casting and cost time and money for removing burrs occured on the boss corresponding to the parting plane of the dies due to insufficient fitting of upper and lower dies resulting from the difficulty of manufacture.

The present invention is intended to overcome the disadvantages in the prior art and will be explained in detail hereinafter with reference to FIGS. 4–11.

Figure 5:
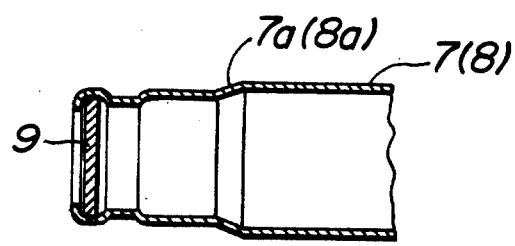
FIG. 5 is a sectional view of the end of the tube shown in FIG. 4.

Referring to FIGS. 4 and 5, a head tube 6 of a frame for use in a bicycle comprises a die-cast joint or lug 10 for integrally combining a top tube 7 and a down tube 8 closed at their ends by closure members 9 with the head tube 6. The tubes 7 and 8 are of course closed, before the closed ends are enclosed in the lug 10 by die casting. The tubes are preferably steel pipes.

According to the present invention, the ends of the frame tube 7, 8 to be inserted in the die-cast lug 10 are tapered as shown at 7a, 8a from the portion corresponding to an end 10b of a boss 10a of the lug 10 toward the extreme end of the tube 7, 8 over a suitable length by working for contraction such as pressing. Before pressing, a closure member 9 is located in the end of the tube, which may be fixed to the tube by calking or welding. However, the closure member may not be fixed to the tube. The closure member 9 in this embodiment is perpendicular to the axis of the tube. It is preferable to form the end of the tube having a reduced diameter portion between the tapered portion and the closure member as shown in the drawings to prevent an undesirable removal of the tube from the boss of the lug. It is also preferable to form a straight portion next to the tapered portion and a reduced diameter portion between the tapered portion and the closed end of the tube to provide sufficient length of the boss of the lug as shown in the drawings. The boss 10a is made straight with a uniform or constant outer diameter or slightly tapered, so that the thickness of the wall of the end 10c of the boss 10c is progressively reduced along the tapered portion 7a, 8a of the tube 7, 8 towards the extreme end of the boss while the necessary and sufficient thickness of the boss of the lug is maintained. The lugs are preferably made of aluminum bronze.

Figure 6:
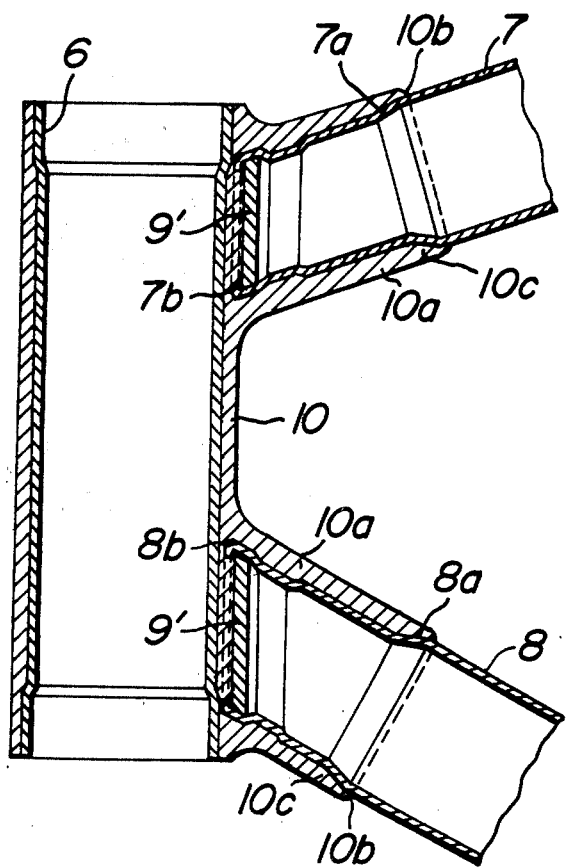
FIG. 6 is a sectional view of a head lug and ends of top and down tubes of another embodiment of the present invention.

FIG. 6 illustrates the other embodiment of the invention, wherein ends 7b and 8b of frame tubes 7 and 8 are arranged in parallel with an outer surface of a butting tube 6 which is connected thereto by a die-cast joint or lug 10. The ends of the tube 7 and 8 are closed by slant closure members 9' oblique to a longitudinal axis of the tube, respectively, and calked thereto before the lug 10 is die-cast. In this manner, the amount of die cast metal for the lug can be effectively reduced which is advantageous in economics.

Figure 7:
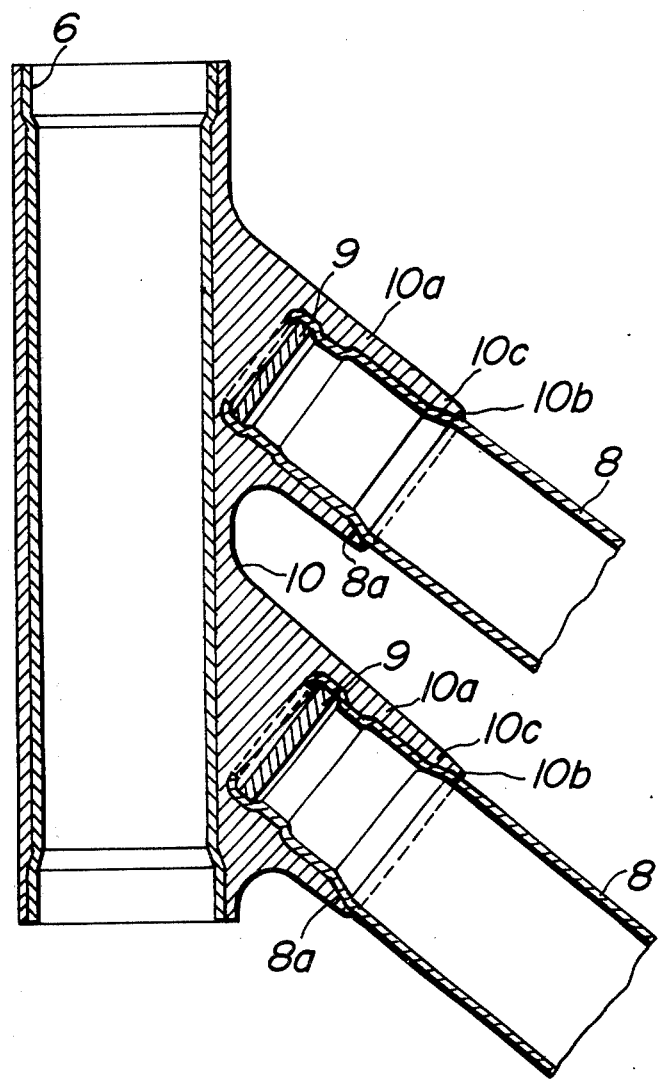
FIG. 7 is a sectional view of a head lug and ends of down tubes in parallel with each other without a top tube according to the present invention.

FIG. 7 illustrates another embodiment according to the invention which is applied to a head tube of a bicycle for example a lady's bicycle comprising two down tubes 8 in parallel with each other and extending downwardly and rearwardly dispensing with the top tube. In this case, a die-cast joint or lug 10 has two bosses 10a into which are inserted respective ends of the down tubes 8 which have been closed by closure members 9.

Figure 8:
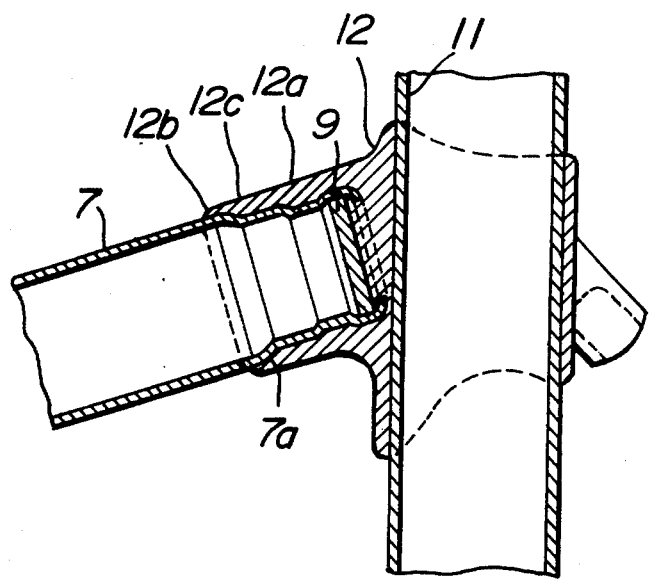
FIG. 8 is a sectional view of a seat lug, one end of a top tube and a seat tube according to the present invention.

FIG. 8 shows a die-cast joint or lug 12 for integrally combining a top tube 7 with a seat tube 11 for supporting a bicycle saddle (not shown). The end of the top tube 7 has been closed by a closure member 9 and is arranged together with the seat tube 11 in dies and thereafter the lug 12 is die-cast in the dies.

Figure 9:
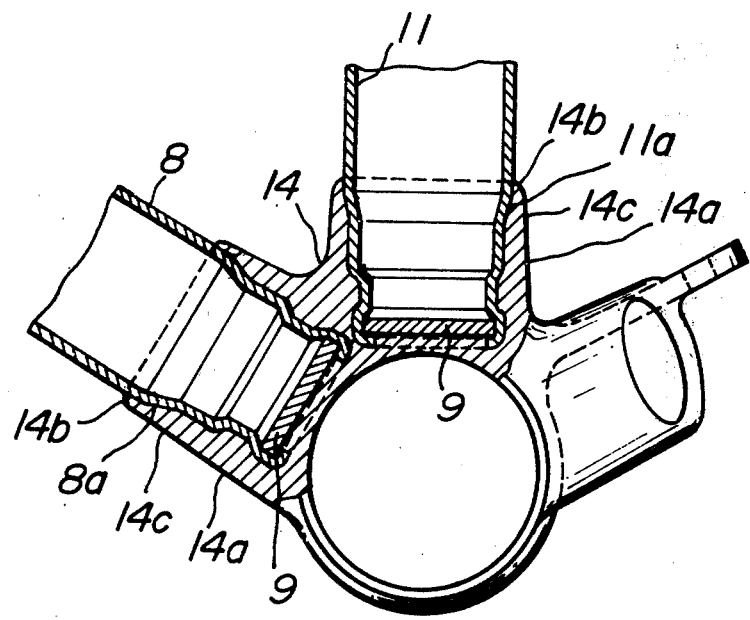
FIG. 9 is a sectional view of a bottom lug or bracket and ends of down and seat tubes according to the present invention.

FIG. 9 illustrates a bottom lug or bracket 14 which is die-cast with the seat tube 11 and down tube 8 whose ends have been previously closed by closure members 9 and tapered at 8a and 11a by pressing.

In effect, the die casting of th head lug, seat lug and bottom bracket is simultaneously effected in dies capable of accommodating therein the frame consisting of top, down and seat tubes arranged in position in a final bicycle frame. However, the respective die casting of the lugs may be effected separately. In the case of the simultaneous die casting, the top, down and seat tubes are arranged in the dies in position in a final frame, and after closing the dies, molten metal is forced into respective die cavities to form the die-cast lugs whose bosses integrally surround the closed ends of the tubes.

The frame for a bicycle according to the present invention comprises die-cast lugs or joints each having necessary and sufficient wall thicknesses and the bosses (10a, 12a, and 14a) of which outer diameters are smaller than those in the prior art and of which ends (10c, 12c and 14c) are tapered toward their extreme ends, thereby eliminating the stress concentration at the extreme ends (10b, 12b and 14b) of the bosses of the lugs as in the prior art. As the result, the frame according to the present invention has an advantage of removal of weak points of the frame.

Figure 10:
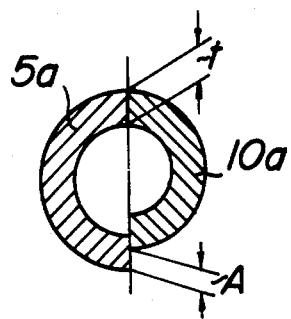
FIG. 10 is an explanatory sectional view for a comparison of cross-sectional areas of bosses of lugs according to the present invention versus prior art.
Figure 11:
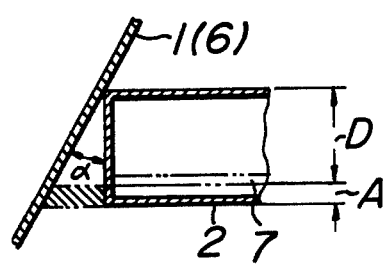
FIG. 11 is an explanatory sectional view for a comparison of longitudinal sectional areas of bosses of lugs according to the present invention versus prior art for explaining the amount of savings of die-cast metal according to the present invention.

Moreover, as the outer diameter of the boss 10a of the die-cast joint or lug 10 is smaller than that in the prior art, the cross-sectional area of the boss is smaller $\pi \times t \times A$ than that in the prior art as shown in FIG. 10 and the longitudinal sectional area is smaller $A \times (-D + A/2) \times \tan\alpha$ than that in the prior art as shown in FIG. 11. In other words, the volume of the bosses 10a becomes smaller to save the amount of the die-cast metal, so that the frame becomes more light weight which saves driving power for a bicycle and saves die-cast metal with a resulting lower cost of manufacture. This effect is particularly remarkable in the embodiment as shown in FIG. 6.

Furthermore, the lug according to the invention has the smaller diameter bosses which make smaller the shoulders formed by the difference in outer diameter between the bosses and tubes. Accordingly, the frame according to the invention has an attractive apperance and improves the the lightness of a bicycle.

While preferred embodiments have been described, variations thereto will occur to those skilled in the art within the scope of the present inventive concepts which are delineated by the following claims.

What is claimed is:

1. A method of manufacturing a bicycle frame consisting of tubes previously closed at their ends and die-cast lugs for connecting said tubes, including steps of arranging said tubes in position in a final frame in dies and forcing molten metal into cavities of said dies corresponding in configuration to said lugs to form said lugs by said molten metal integrally including said closed ends of said tubes, the improvement comprising steps of forming tapered portions at said closed ends of the tubes before die casting said lugs, said tapered portion extending from that corresponding to an extreme end of a boss of said lug surrounding the end of the tube toward an extreme end of the tube, closing each said end of said tube by a closure member oblique to a longitudinal axis of the tube and in parallel with an outer surface of a tube to be buttingly connected to said tube, and forming outer surfaces of said bosses of the die-cast lugs in substantially constant outer diameter, thereby progressively reducing thicknesses of walls of the bosses at their extreme ends along said tapered portions of said tubes, maintaining necessary and sufficient thickness of said lugs.

2. A bicycle frame consisting of tubes closed at their ends and lugs for connecting said tubes said lugs being formed by die casting integrally with said closed ends of said tubes, the improvement comprising said tubes being formed at their closed ends with tapered portions each extending from that corresponding to an extreme end of a boss of said lug surrounding the end of the tube toward an extreme end of the tube, each said closed end of said tube being closed by a closure member oblique to a longitudinal axis of the tube and in parallel with an outer surface of a tube to be buttingly connected to said tube, and outer surfaces of said bosses of the die-cast lugs being in substantially constant outer diameter, thereby progressively reducing thicknesses of walls of the bosses at their extreme ends along said tapered portions of said tubes, maintaining necessary and sufficient thickness of said lugs.

* * * * *